United States Patent
Citrynell et al.

(10) Patent No.: US 7,007,592 B2
(45) Date of Patent: Mar. 7, 2006

(54) STEAMER/SMOKER MULTI-PURPOSE GRILLING DEVICE

(75) Inventors: Andrew Citrynell, 264 Sunrise La., Carbondale, CO (US) 81623; Kimberly Ann Miller, Carbondale, CO (US)

(73) Assignee: Andrew Citrynell, Carbondale, CO (US)

( * ) Notice: Subject to any disclaimer, the term of this patent is extended or adjusted under 35 U.S.C. 154(b) by 143 days.

(21) Appl. No.: 10/400,209

(22) Filed: Mar. 26, 2003

(65) Prior Publication Data

US 2004/0187703 A1     Sep. 30, 2004

(51) Int. Cl.
*A47J 37/10* (2006.01)

(52) U.S. Cl. .............. 99/347; 99/410; 99/445; 99/446

(58) Field of Classification Search ........... 99/482, 99/445, 446, 410, 346, 347, 413, 450; 219/401, 219/524; 126/369
See application file for complete search history.

(56) References Cited

U.S. PATENT DOCUMENTS

| | | | | |
|---|---|---|---|---|
| 1,371,520 A | * | 3/1921 | Schafer | 126/369 |
| 3,604,334 A | * | 9/1971 | Ballentine | 99/483 |
| 3,814,901 A | * | 6/1974 | Morhack | 219/401 |
| 5,400,701 A | * | 3/1995 | Sham | 99/410 |
| 5,584,235 A | * | 12/1996 | DuBois et al. | 99/413 |
| 6,119,585 A | | 9/2000 | Guidry | |
| 6,503,551 B1 | | 1/2003 | Hester | |
| 6,530,308 B1 | | 3/2003 | Lin | |

* cited by examiner

*Primary Examiner*—Reginald L. Alexander
(74) *Attorney, Agent, or Firm*—Townsend and Townsend and Crew LLP

(57) ABSTRACT

A grilling system comprises a grill base that is adapted to be heated. The grill base has a top end, a bottom end, and an open interior that is adapted to hold a heatable substance that produces smoke or liquid vapors when heated. A manifold is coupled to the grill base so as to be positioned above the heatable substance. A grill member is positioned above the manifold. The grill member comprises at least one grill surface having a plurality of holes. The grill surface is configured to receive a grillable substance, whereby smoke or liquid vapors rising from the grill base pass through the manifold and then through the holes in the grill surface.

14 Claims, 5 Drawing Sheets

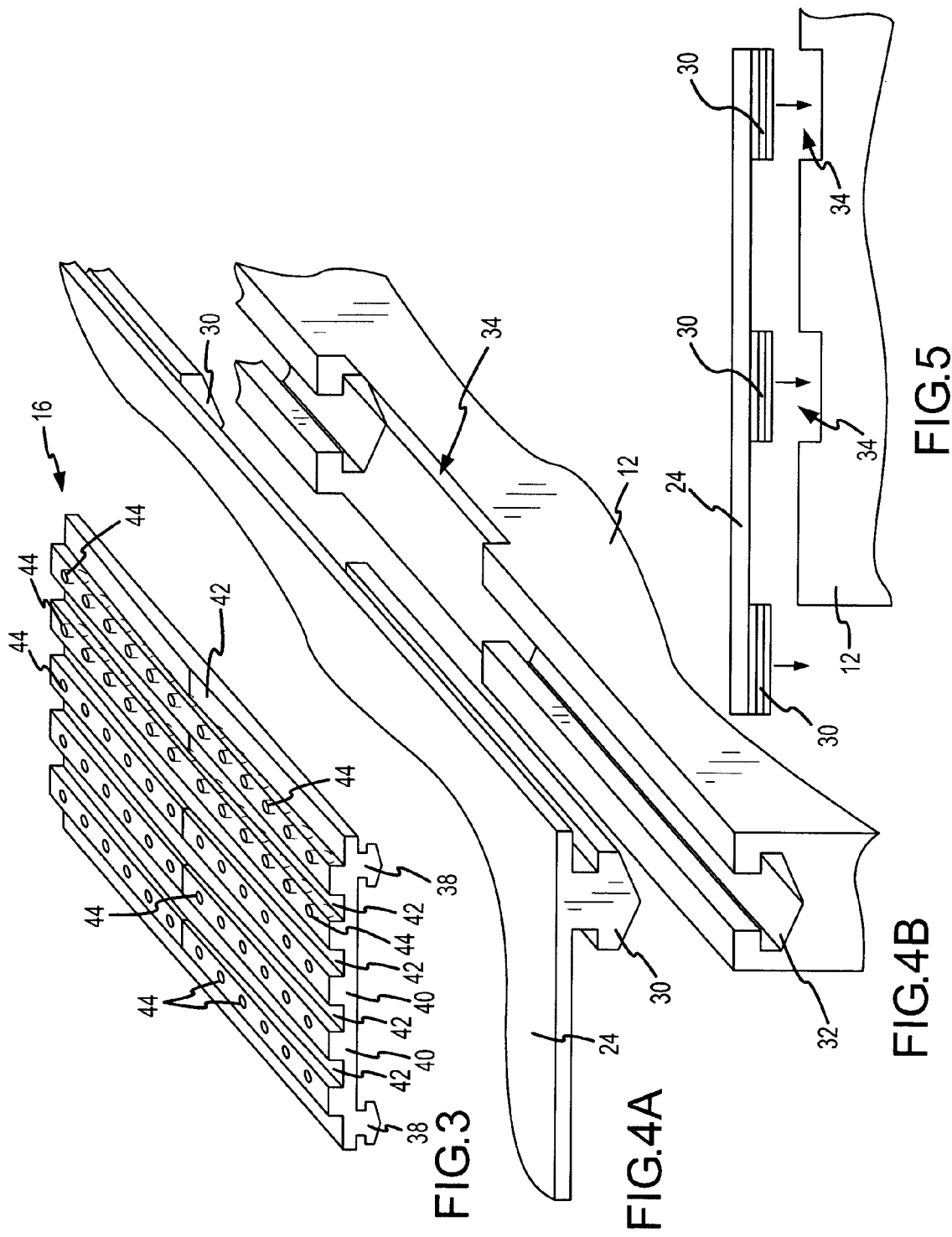

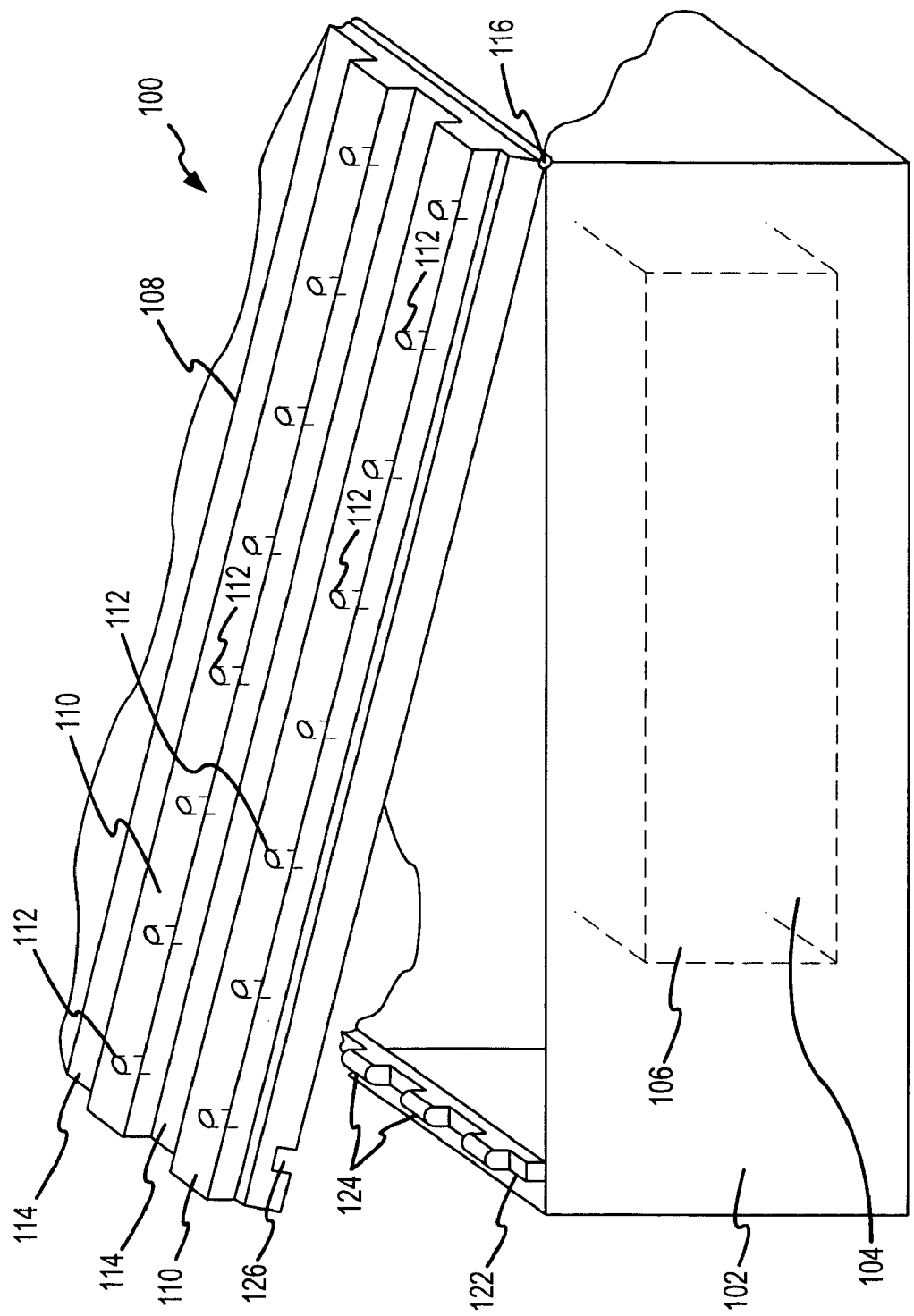

STEAMER/SMOKER MULTI-PURPOSE GRILLING DEVICE

BACKGROUND OF THE INVENTION

This invention relates generally to the field of cooking, and in particular to the grilling of grillable substances, such as meats, fish, poultry, vegetables, vegetable burgers and the like. More specifically, the invention relates to the cooking of such substances using a grill while simultaneously steaming and/or smoking such substances.

Grilling is a favorite pastime for many throughout the world. Perhaps the most common types of grills are traditional charcoal-type grills, open flame grills and grills using heating elements. With charcoal-type grills, a pile of charcoal pieces is ignited in a grill base. Once the charcoals turn into coals, a grill is placed over the coals and the item to be grilled is placed onto the grill. Open flame grills typically use a flammable gas, such as propane or natural gas, to produce an open flame. A grill is placed over the open flame and the item to be cooked is placed onto the grill. Grills that utilize heating elements can take a variety of forms including solid grill surfaces that are directly heated with electrical elements, open flames or the like.

With each of these systems, it is difficult to conveniently flavor the food during grilling. Further, the grilling process tends to dry out the food, especially meats that are well cooked.

BRIEF SUMMARY OF THE INVENTION

The invention provides grilling systems and methods that permit essentially any type of grillable substance to be grilled while simultaneously providing smoke and/or steam to the grillable substance. Further, greases or other liquids may be drained from the grillable substance. These features may serve to flavor and/or moisten the food, even when well cooked. In this way, the grilled food may better tasting, moister and healthier.

In one embodiment, a grilling system comprises a grill base that is adapted to be heated, such as with a conventional type of grill. The grill base has a top end, a bottom end, and an open interior that is adapted to hold a heatable substance that produces smoke or liquid vapors when heated. A manifold is removably coupled to the grill base so as to be positioned above the heatable substance. A grill member is also positioned above the manifold. The grill member comprises at least one grill surface having a plurality of holes over which a grillable substance may be placed. In this way, when the grill base is heated, smoke or liquid vapors rise from the grill base and pass through the manifold where they pass through the holes in the grill surface. Hence, the grillable substance is grilled by virtue of being in contact with the grill surface that in turn is heated by heat transferred from the base, to the manifold and to the grill member. At the same time, the smoke and/or vapors contact the grillable substances through the holes in the grill surface to cook, flavor and/or moisten the grillable substance. The grill base may be constructed to have a wide variety of shapes, such as rectangular, square, pyramidal, circular, oblong, and the like.

Optionally, the system may also include an insert that is configured to fit within the interior of the grill base. Conveniently, the insert may be used to hold the heatable substance, although in some cases, the heatable substance may be held directly within the interior. Examples of heatable fluids that may be placed into the insert include wine, beer, soda pop, liquid spices, flavored fluids, and the like. Heatable substances that may be placed into the interior include moist wood chips and other substances that produce smoke when heated. The insert may also have a wide variety of shapes including rectangular, square, circular, oval, triangular and the like.

In one aspect, the grill base comprises a thermally conductive material and the insert comprises a ceramic or other material that may be heated to grill temperatures. Also, the manifold may comprise a thermally conductive material, and the grill surface comprises a grill material. The use of such materials facilitates heat transfer up to the grill surface.

In another aspect, the grill member comprises a plurality of grill surfaces that each include a plurality of holes that are in fluid communication with the manifold. The grill member also includes a plurality of downwardly angled fluid removal channels interleaved between the grill surfaces. In this way, greases or other liquids may drain from the grill member and down into the grill.

In one particular aspect, the manifold comprises a top platform that is removably coupled to the top of the grill base, a bottom platform that is removably coupled to the grill member, and a plurality of conduits extending between the top platform and the bottom platform. Conveniently, the top platform may include a male connector, and the grill base may include a female connector that is matable within the male connector to permit the two parts to be easily separated. Similarly, the grill member may include a male connector, and the bottom platform may include a female connector that is matable within the male connector.

The invention also provides an exemplary method for grilling a grillable substance. The method utilizes a grill base having a top end, a bottom end, and an open interior. A heatable substance is placed into the interior, and a manifold is coupled to the grill base so as to be positioned above the heatable substance. A grill member is positioned above the manifold and comprises at least one grill surface having a plurality of holes. At least one grillable substance is placed onto the grill surface, and the grill base is heated to cause heat to be transferred to the grill surface to grill the grillable substance. Heating of the base also produces smoke or liquid vapors from the heatable substance. The smoke or liquid vapors rise from the grill base and pass through the manifold and then through the holes in the grill surface to cook, flavor and/or moisten the grillable substance.

To heat the base, it may be placed onto a barbecue grill or other heating element. Further, the heatable substance may comprise moist wood chips that are placed into the interior to produce the smoke. Alternatively, the heatable substance may comprise a liquid that may conveniently be poured into an insert that in turn is placed into the interior.

In another feature, the grill base may be removed from the manifold, the manifold may be removed from the grill surface, and the grill base, the manifold and the grill surface may be washed. For example, these components may be washed in a conventional dishwasher.

BRIEF DESCRIPTION OF THE DRAWINGS

FIG. 3 is a perspective view of a grill member of the grilling system of FIG. 1.

FIG. 4A is a more detailed view of a top platform of the grilling system of FIG. 1.

FIG. 4B is a detailed view of a female connector of a grill base for mating with the male connector of FIG. 4A.

FIG. 5 is a cut away, exploded front view of the top platform of FIG. 4A and the grill base of FIG. 4B.

FIG. 6 is a partially cut away perspective view of another embodiment of a grilling system according to the invention.

DETAILED DESCRIPTION OF THE INVENTION

The invention provides grilling systems and techniques for grilling grillable substances. Such substances may include, for example, meats, poultry, fish, vegetables, fruits, vegetable burgers, and the like. The grillable substances are placed onto a grill surface that has a plurality of holes that permit rising smoke and/or steam to pass upwardly through the grill surface and into contact with the grillable substance. In this way, the grillable substance may be grilled while also being smoked, flavored and/or moistened. The grill surface may also include downwardly sloping channels that permit greases and other liquids to drain from the grill surface where they drip onto the grill. This in turn allows for healthier cooking.

The grilling systems may utilize a grill base that may be placed onto a grill or any other type of heat source, including any of the grill types discussed in the Background section. The grill base is constructed of a thermally conductive material, such as metal, to permit heat to transfer to the grill surface. Further, the grill base may be used to hold a heatable substance that in turn is used to produce the smoke and/or steam. Examples of such heatable substances include wines, beer, soda pop, flavored liquids, water, juices, spices, wood chips, and the like. When steam is produced, the steam helps to moisten the substance, even when cooked until it is well done (such as when cooking meat to eliminate bacteria and disease).

To distribute the smoke and/or steam as well as to transfer heat, the grilling systems may utilize a manifold that may be constructed of a heat conducting material, such as metal. A variety of connectors may be used to couple the manifold to the grill base and the grill surface in a removable manner. Examples of such connectors include, for example, mating male and female connectors, screws, latches, bolts, clips, snaps and the like. By making the components removable, the grilling system may easily be disassembled for cleaning. For example, the components may easily fit within a dishwasher.

Figure 1:
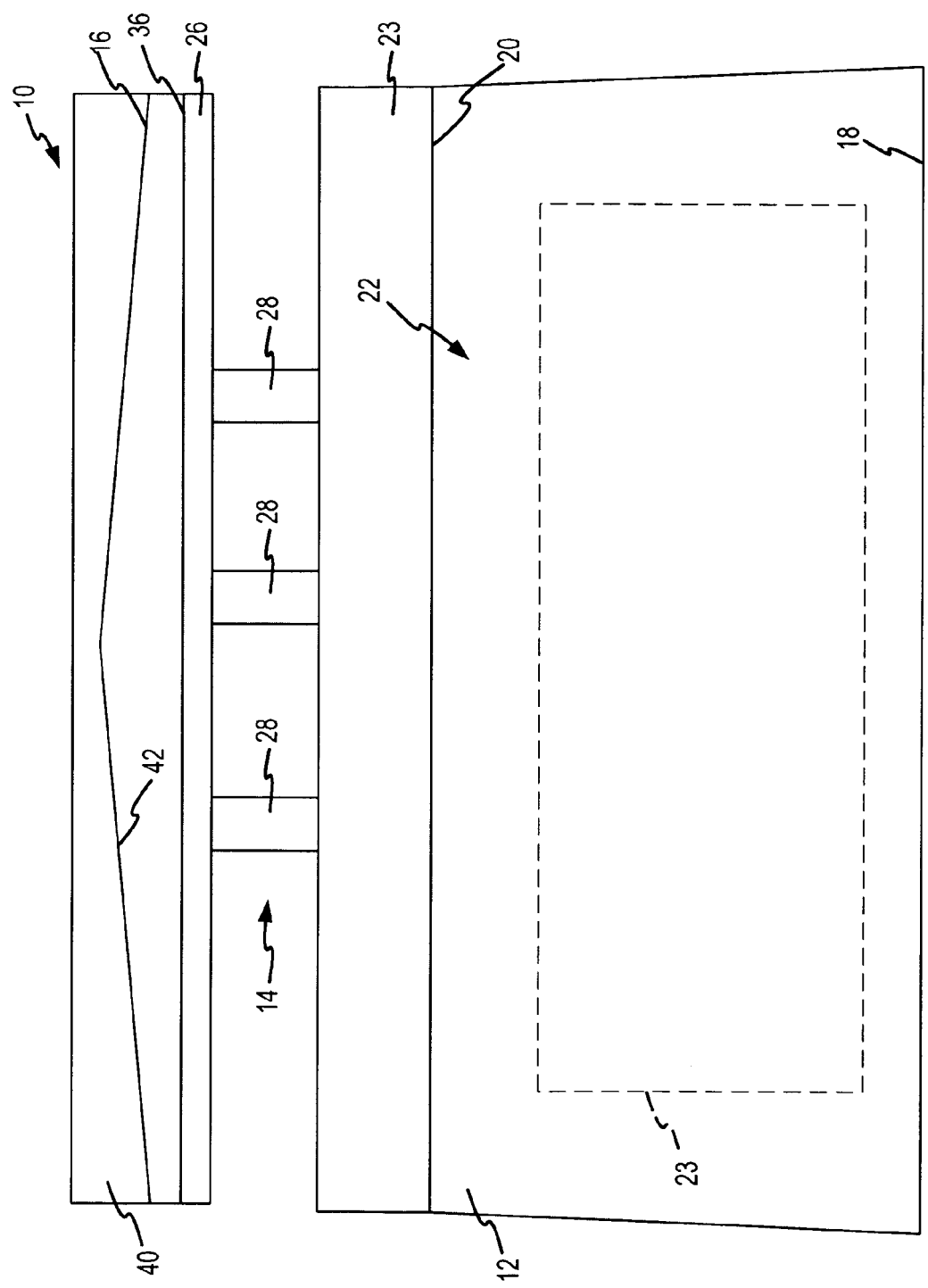
FIG. 1 is a front view of an embodiment of a grilling system according to the invention.
Figure 2:
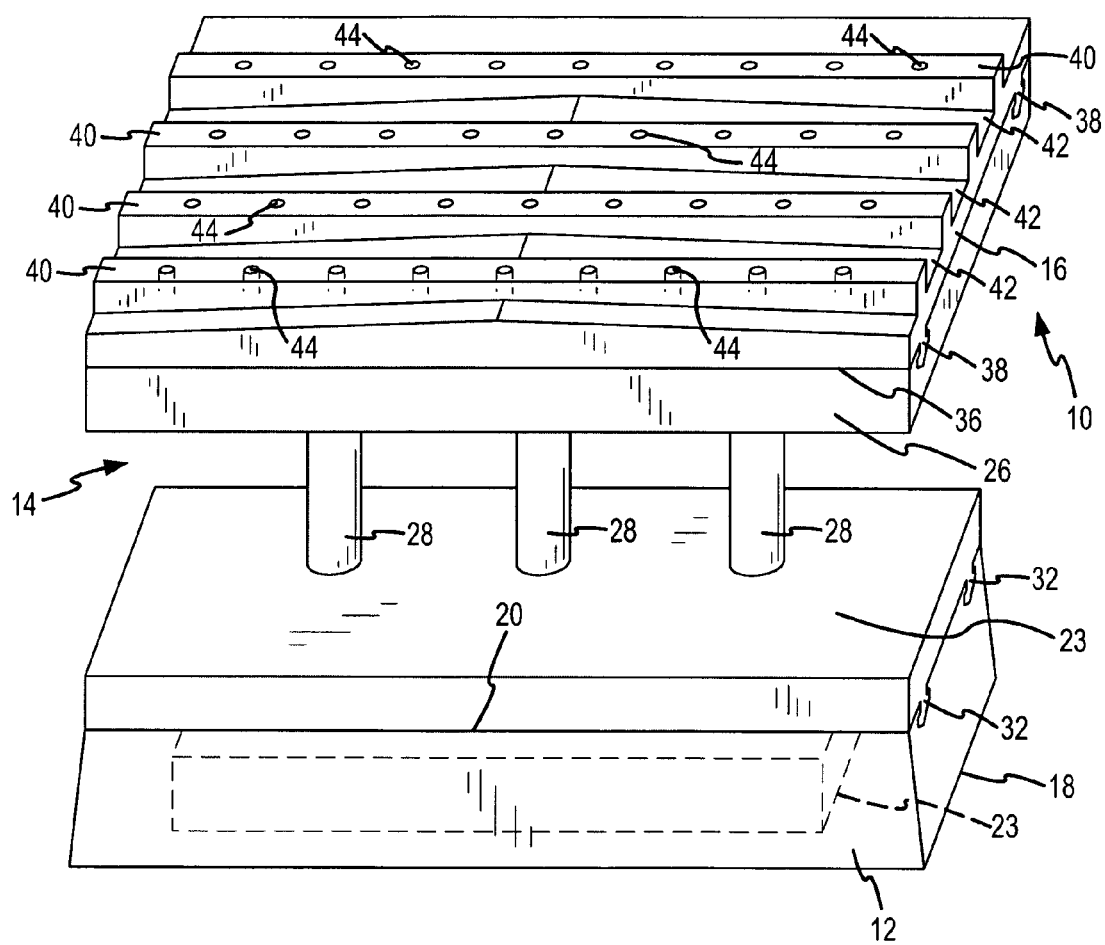
FIG. 2 is a front perspective view of the grilling system of FIG. 1.

Referring now to FIGS. 1 and 2, one embodiment of a grilling system 10 will be described. Grilling system 10 comprises a grill base 12, a manifold 14 and a grill member 16. Grill base 12 has a bottom end 18, an open top end 20 and an interior 22 that is accessible from the open top end 20. Bottom end 18 is generally flat and is configured to rest on essentially any type of heated surface, such as a conventional grill, a heating element, or the like. Grill base 12 is preferably constructed of a thermally conductive material, such as metal, aluminum, or the like to efficiently transfer heat to interior 22 as well as to grill member 16.

The interior 22 of grill base 12 may be used to hold a substance that may be heated to produce smoke and/or liquid vapors that rise up into manifold 14. Such substances may comprise those that produce smoke, such as wood chips, as well as various types of liquids that produce steam when heated. The size of the interior may be varied depending on the substance used. Further, the size of bottom end 18 may vary depending on how much heat needs to be transferred, as well as on the size of grill member 16. Another advantage is that the grill base may be constructed to be small enough that it takes up only part of the grill upon which it rests. In this way, other food items may be grilled in the traditional manner on the grill while the grill is used to supply heat to the grill base 12. For example, the grill base could be small enough to take up only about ⅛ of the rest of the barbecue grill.

Optionally, an insert 23 may be held within interior 22 to hold a liquid that is to be heated. Insert 23 may comprise essentially any type of open vessel that is capable of holding a liquid and that can withstand the grilling temperatures. Examples of materials that may be used include ceramics, metals, composites, and the like. One advantage of using insert 23 is that it may easily be removed for cleaning.

Manifold 14 is constructed of a top platform 24, a bottom platform 26 and a set of conduits 28 that fluidly connect top platform 24 to bottom platform 26. Top platform 24 is also shown in FIGS. 4A and 5 and comprises a thermally conductive plate having through holes that are aligned with conduits 28. In this way, when top platform 24 is coupled to grill base 12, the interior 22 is completely sealed except for the through holes. As such, when smoke or steam is produced within interior 22, it rises upward and exits the interior 22 through conduits 28.

As best illustrated in FIGS. 2, 4A, 4B and 5, top platform 24 includes a series of male connectors 30 that are configured to mate with corresponding slots 32 in grill base 12. Conveniently, male connectors 30 may be integrally formed with top platform 24 for ease of manufacture. Grill base 12 may also include various recesses 34 to permit the connectors 30 to be aligned with slots 32 (see FIG. 5). Once aligned, top platform 24 may be slid relative to grill base 12 to slide connectors 30 within slots 32 until the top platform 24 is aligned with grill base 12. Hence, to gain access to interior 22, such as when needing to place insert 23 and/or a substance into interior 22, top platform 24 may simply be slid until connectors 30 are aligned with recesses 34. Top platform 24 may then be lifted from grill base 12. Although shown with a slidable connection system, it will be appreciated that other types of connectors may be used as well including other interlocking designs, bolts, screws, clips, detents, and the like.

As shown, manifold 14 includes three conduits 28 having a diameter in the range from about ¼ inch to about 2 inches. In some embodiments, conduits 28 may have other shapes and corresponding cross sectional areas. The conduits may also have a height in the range from about ⅛ inch to about 6 inches. This configuration helps to insure that sufficient smoke and/or vapors reach the item being grilled. Conduits 28 also help to insure that the smoke or steam is evenly distributed to the entire grill surface so that all areas are evenly treated. By directing the smoke and/or steam up through conduits 28, the grill surface is spaced apart from the source of the smoke and/or steam to permit the smoke and/or steam to adequately diffuse so there is an even application to the items being grilled. In cases where smoking wood chips are used, the separation of the grill member 16 from interior 22 helps to insure than no soot from the smoking embers reaches grill member 16. Conduits 28 are preferably constructed of a thermally conductive material to permit heat from grill base 12 to be transferred to grill member 16. Although shown with three conduits 28, it will be appreciated that other numbers and/or sizes of conduits may be used as well. Further, in some cases, the conduits may be eliminated altogether so that the smoke and/or vapors pass directly to grill member 16.

Bottom platform 26 includes holes that are aligned with conduits 28. Further, bottom platform 26 includes four sides that form a cavity. When grill member 16 is coupled to bottom platform 26 it forms an open interior region that also functions as a plenum to distribute the rising smoke and/or vapors across a bottom end 36 of grill member 16. Bottom platform 26 may also be constructed of a thermally conductive material to transfer heat to grill member 16. Bottom platform 26 and grill member 16 may include an interlocking connection system similar to the system described in connection with grill base 12 and top platform 24 to permit the two components to be easily separated, such as for cleaning. For example, grill member 16 may include male connectors 38 that are similar to male connectors 30, and bottom platform 26 may include slots and recesses that are similar to slots 32 and recesses 34 in grill base 12. However, it will be appreciated that other types of connectors may be used as well.

As best shown in FIGS. 2 and 3, grill member 16 may be constructed of a single piece of a grill material, such as metal, and may easily be removed from bottom platform 26. Grill member 16 includes a plurality of raised grill surfaces 40 that are generally parallel to and spaced apart from each other, although different configurations and orientations may be used as well. Grill surfaces 40 are designed to hold the substance being grilled. When grilling system 10 is placed onto a grill or otherwise heated, heat from base 12 is transferred through the device and up to grill surface which becomes hot enough to grill the substance resting on grill surfaces 40.

Positioned between grill surfaces 40 are a plurality of recessed channels 42. Channels 42 slope downward from an apex that is in the middle of grill member 16. In this way, greases or other liquids from the item being grilled flow down the channels and away from grill surfaces 40. When these liquids reach the edge of grill member 16, they drip off of grill member 16 and fall into the grill being used to supply the heat. Most grills include drip pans that may collect these liquids. Use of channels 42 thus helps to remove any grease or other undesirable substances from the item being grilled to produce a healthier food product.

Extending through grill surfaces 40 are a plurality of through holes 44 that completely pass through grill member 16. In this way, smoke and/or vapors rising up from interior 22 pass through conduits 28 and into the cavity defined by bottom platform 26. Here, the smoke and/or vapors are distributed across bottom 36 of grill member 16 and pass up through holes 44. As the smoke and/or vapors pass upwardly through holes 44, they come into contact with the items on grill surfaces 40. Depending on the type of smoke and/or steam, the items being grilled may be flavored, moistened and/or further cooked. Hence, the items being grilled may be smoked and/or steamed while simultaneously being grilled. Such a system may therefore be used to flavor the items without requiring them to continually be basted. Further, the items may be provided with a moist delicate flavor because they are moistened while being cooked, even if cooked to the point of being well done. As such, meats may be well cooked to eliminate bacteria or disease while still being moist and delicate.

The number and/or sizes of holes 44 may be varied depending upon a variety of factors, including the type of item being grilled, the substance used to produce the smoke and/or steam, the amount of flavoring required and the like. As one example, the holes may have a diameter in the range from about 1/16 inch to about 1/2 inch. If the holes have other shapes, the holes may have similar cross sectional areas. The holes are preferably large enough to prevent clogging while being small enough to keep a suitable grilling surface. The holes may be appropriately spaced apart to provide enough smoke or steam to the food while also providing an appropriate grilling surface. Another advantage of using channels 42 is that they assist to remove any liquids or greases so that holes 44 do not become clogged. Further, grill member 16 may easily be removed following grilling and placed into a dishwasher for cleaning in case any holes do become clogged.

One significant advantage of using the grill member is that is includes holes small enough to providing for smoking and/or steaming, but which are small enough so that food does not fall through them. In this way, small items, such as small vegetables, do not fall through the grilling surface where they could be lost or burned.

Figure 7:
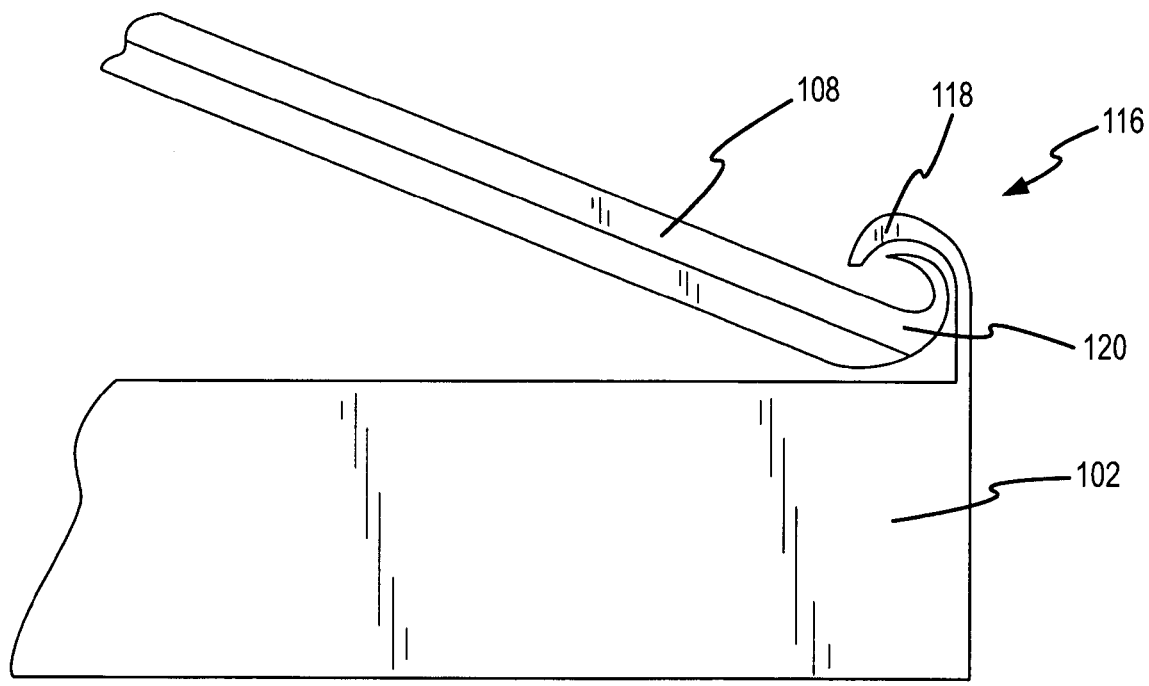
FIG. 7 is a more detailed view of a locking mechanism of the grilling system of FIG. 6.

Referring now to FIGS. 6 and 7, another embodiment of a grill system 100 will be described. Grill system 100 is similar to the other embodiments, but does not use conduits to separate the cavity containing the heatable substance from the grill surface. More specifically, grill system 100 comprises a grill base 102 that is configured to be heated in a manner similar to the grill base of FIG. 1. Further, grill base 102 may have any of the shapes as previously described for the grill base of FIG. 1. Grill base 102 has an open interior 104 for holding a substance to be heated in a manner similar to that previously described. Further, the interior 104 may hold an insert 106 for holding a liquid to be heated in a manner similar to that described with other embodiments.

Coupled to grill base 102 is a grill member 108 that may be configured to function similar to the other grill members described herein. Grill member 108 includes a plurality of grill surfaces 110 that each include a plurality of through holes 112. Positioned between grill surfaces 110 are channels 114 to permit fluids to run off of grill member 108 in a manner similar to that previously described.

In use, grill member 108 is placed on top of grill base 102 so that smoke and/or steam from interior 104 passes upward through holes 112 to smoke, flavor and/or moisturize the substance being grilled. At the same time, heat from base 102 is transferred to grill surfaces 110 to grill the food in a manner similar to that previously described. As such, the components used to construct grill system 100 may be similar to the materials described with other embodiments.

Grill member 108 may be removably coupled to grill base 102 using a variety of techniques and connectors. Shown in FIG. 7 is one type of interlocking connector system 116 that may be used. Connector system 116 comprises a curved female locking mechanism 118 and a curved male locking mechanism 120. To connect the two components, grill member 108 is positioned in a generally vertical orientation and male locking mechanism 120 is inserted into female locking mechanism 118. Grill member 108 is then rotated downward until it rests on the top of grill base 102. The opposite movement may be used to separate the two components, such as for washing or placing substances into interior 104.

The opposite end of base 102 may include a male locking member 122 having a plurality of teeth 124. Locking member 124 is configured to mate with a female locking member 126 on grill member 108. When grill member 108 rests upon base 102, teeth 124 extend up into grill member 108 to contact the bottom of grill surfaces 110 while the bottom of channels 114 rest in the regions between teeth 124 to interlock the two components.

The invention has now been described in detail for purposes of clarity and understanding. However, it will be appreciated that certain changes and modifications may be practiced within the scope of the appended claims.

What is claimed is:

1. A grilling system, comprising:
    a grill base that is adapted to be heated wherein the grill base has a top end, a bottom end, and an open interior with an insert that divides the open interior into multiple separate chambers that are each adapted to hold a heatable substance that produces smoke or liquid vapors when heated;
    a grill holder removably coupled to the grill base so as to be positioned above the heatable substance, wherein the grill holder comprises a central opening through which the smoke or liquid vapors pass upward from the grill base, an outer holding region and an inner region disposed below the outer holding region;
    a grill member removably held by the outer holding region of the grill holder so as to be positioned above the central opening, wherein the grill member is configured to receive a grillable substance, whereby smoke or liquid vapors rising from the grill base pass through the central opening and then through the grill member.

2. A grilling system as in claim 1, wherein the grill base comprises a thermally conductive material and the insert comprises a ceramic.

3. A grilling system as in claim 1, wherein the grill holder comprises a thermally conductive material, and wherein the grill member comprises a grill material.

4. A grilling system as in claim 1, wherein the grill member comprises a plurality of grill surfaces that each include a plurality of holes that are in fluid communication with the manifold, and further comprising a plurality of downwardly angled fluid removal channels interleaved between the grill surfaces.

5. A grilling system, comprising:
    a grill base that is adapted to be heated, wherein the grill base has a top end, a bottom end, and an open interior that is adapted to hold at least one heatable substance that produces smoke or liquid vapors when heated, wherein the interior includes an insert that divides the interior into at least two separate chambers;
    a grill holder coupled to the grill base so as to be positioned above the heatable substance, wherein the grill holder comprises a central opening through which the smoke or liquid vapors pass upward from the grill base, an outer holding region and an inner region disposed below the outer holding region;
    a grill member held by the outer holding region of the grill holder so as to be positioned above the central opening, wherein the grill member is configured to receive a grillable substance, whereby smoke or liquid vapors rising from the grill base pass through the central opening and then through the grill member.

6. A grilling system as in claim 5, wherein the grill base comprises a thermally conductive material.

7. A grilling system as in claim 5, wherein the grill holder comprises a thermally conductive material, and wherein the grill member comprises a grill material.

8. A method for grilling a grillable substance, the method comprising:
    providing a grill base having a top end, a bottom end, and an open interior, wherein the interior an insert that divides the interior into at least two separate chambers;
    placing at least two heatable substances into the interior;
    coupling a grill holder to the grill base so as to be positioned above the beatable substances, wherein the grill holder comprises a central opening, an outer holding region and an inner region disposed below the outer holding region;
    placing a grill member onto the holding region of the grill holder so as to be positioned above the inner region and the central opening;
    placing at least one grillable substance onto the grill surface;
    heating the grill base to cause heat to be transferred to the grill surface to grill the grillable substance and to produce smoke or liquid vapors from the beatable substances, wherein the smoke or liquid vapors rise from the grill base and pass through the central opening and then through the grill member.

9. A method as in claim 8, further comprising placing the grill base onto a barbecue grill to provide the heat to the grill base.

10. A method as in claim 8, wherein one of the heatable substances comprises moist wood chips that are placed into the interior.

11. A method as in claim 8, wherein one of the heatable substances comprises a liquid.

12. A method as in claim 11, further comprising pouring the liquid into one of the chambers.

13. A method as in claim 8, further comprising removing the grill base from the grill holder, removing the grill holder from the grill member, and washing the grill base, the grill holder and the grill member.

14. A grilling system, comprising:
    a grill base that is adapted to be heated, wherein the grill base has a top end, a bottom end, and an open interior that is adapted to hold a heatable substance that produces smoke or liquid vapors when heated, wherein the grill base includes an insert that divides the open interior into multiple separate chambers for holding different heatable substances;
    a grill member positioned above the grill base, wherein the grill member is configured to receive a grillable substance, whereby smoke or liquid vapors rising from the grill base pass through the grill member.

* * * * *